(12) United States Patent
Benson

(10) Patent No.: US 8,240,273 B2
(45) Date of Patent: Aug. 14, 2012

(54) PLUSH TREAT DISPENSER

(75) Inventor: Harold Keith Benson, Hutto, TX (US)

(73) Assignee: Triple Crown Dog Academy, Inc., Hutto, TX (US)

( * ) Notice: Subject to any disclaimer, the term of this patent is extended or adjusted under 35 U.S.C. 154(b) by 312 days.

(21) Appl. No.: 12/581,349

(22) Filed: Oct. 19, 2009

(65) Prior Publication Data

US 2010/0251966 A1    Oct. 7, 2010

Related U.S. Application Data

(60) Provisional application No. 61/165,637, filed on Apr. 1, 2009.

(51) Int. Cl.
*A01K 29/00* (2006.01)
(52) U.S. Cl. ..................... 119/51.01; 221/24
(58) Field of Classification Search ............... 119/51.01, 119/702, 709, 710, 711; 446/369; 221/24
See application file for complete search history.

(56) References Cited

U.S. PATENT DOCUMENTS

| | | | |
|---|---|---|---|
| 2,601,852 A | 7/1952 | Wendt | |
| 2,711,052 A * | 6/1955 | Brayford | 446/73 |
| 3,333,360 A * | 8/1967 | Hardy | 446/369 |
| 3,757,781 A | 9/1973 | Smart | |
| 3,984,000 A | 10/1976 | Miller | |
| 4,277,910 A | 7/1981 | Kramer | |
| 4,667,430 A * | 5/1987 | Ziese, Jr. | 43/1 |
| 4,928,632 A * | 5/1990 | Gordon | 119/709 |
| 4,978,030 A * | 12/1990 | Morris et al. | 221/3 |
| D322,469 S * | 12/1991 | Berger et al. | D21/604 |
| 5,356,035 A * | 10/1994 | Shlopak et al. | 222/78 |
| 5,451,176 A * | 9/1995 | Beltman | 446/73 |
| 5,540,611 A | 7/1996 | Lapoint et al. | |
| 5,584,805 A | 12/1996 | Sutton | |
| 5,653,196 A * | 8/1997 | Bartleson | 119/711 |
| 5,779,570 A * | 7/1998 | Bear | 473/481 |
| 5,897,027 A | 4/1999 | Steiner et al. | |
| 6,073,588 A * | 6/2000 | McClung et al. | 119/709 |
| 6,089,947 A * | 7/2000 | Green | 446/268 |
| 6,328,157 B1 * | 12/2001 | Tolver | 206/216 |
| 6,350,169 B1 * | 2/2002 | Holt | 446/327 |
| 6,676,478 B1 * | 1/2004 | Starner | 446/369 |
| 6,688,258 B1 | 2/2004 | Kolesar | |
| 6,739,933 B2 * | 5/2004 | Taylor | 446/28 |
| 6,749,479 B2 * | 6/2004 | Vick | 446/73 |
| 6,755,712 B2 * | 6/2004 | Morris | 446/98 |
| 6,786,792 B2 * | 9/2004 | Ritchey | 446/71 |
| 6,824,112 B2 * | 11/2004 | Lange | 248/102 |
| 6,827,317 B1 * | 12/2004 | Maki Risaliti | 248/102 |
| 6,840,197 B1 * | 1/2005 | Trompke | 119/711 |
| D506,578 S | 6/2005 | Cole | |
| 6,953,007 B1 | 10/2005 | Cummings | |
| 6,983,722 B2 * | 1/2006 | Tepper et al. | 119/709 |
| 7,144,293 B2 * | 12/2006 | Mann et al. | 446/184 |
| D632,744 S * | 2/2011 | Hunt | D21/605 |
| 2002/0134318 A1 * | 9/2002 | Mann et al. | 119/709 |
| 2005/0121339 A1 | 6/2005 | Tepper et al. | |
| 2009/0314221 A1 * | 12/2009 | Wang | 119/707 |
| 2010/0326369 A1 * | 12/2010 | Freeman et al. | 119/709 |

* cited by examiner

*Primary Examiner* — Yvonne Abbott
(74) *Attorney, Agent, or Firm* — Yudell Isidore Ng Russell PLLC

(57) ABSTRACT

In at least one embodiment, an animal treat dispenser includes a treat container having an aperture, an aperture adjustment mechanism that is capable of varying an effective size of the aperture to regulate passage of animal treats through the aperture, and a plush toy at least partially covering the treat container.

17 Claims, 4 Drawing Sheets

PLUSH TREAT DISPENSER

PRIORITY CLAIM

The present application claims priority to U.S. Patent Application Ser. No. 61/165,637, filed Apr. 1, 2009.

BACKGROUND OF THE INVENTION

1. Technical Field

The present invention relates in general to animal treat dispensers.

2. Description of the Related Art

Various types of treat dispensers are known in the art. A common objective of many conventional animal treat dispensers is to use the dispensing of treats to incentivize animal interaction with the animal treat dispenser.

SUMMARY OF THE INVENTION

In at least one embodiment, an animal treat dispenser includes a treat container having an aperture, an aperture adjustment mechanism that is capable of varying an effective size of the aperture to regulate passage of animal treats through the aperture, and a plush toy at least partially covering the treat container.

DETAILED DESCRIPTION OF ILLUSTRATIVE EMBODIMENT

Figure 1:
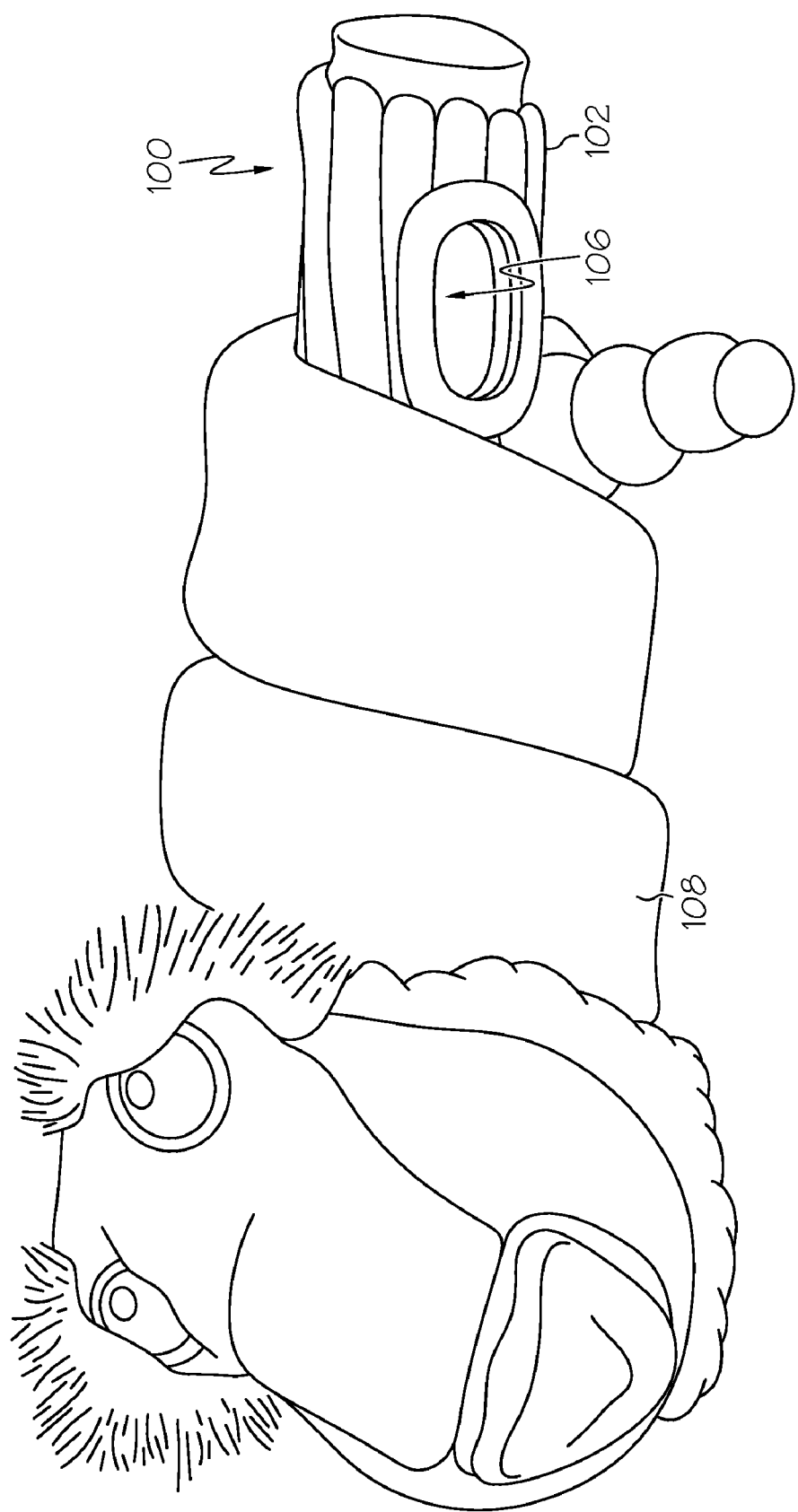
FIG. 1 is a view of an exemplary animal treat dispenser in accordance with one embodiment.
Figure 2:
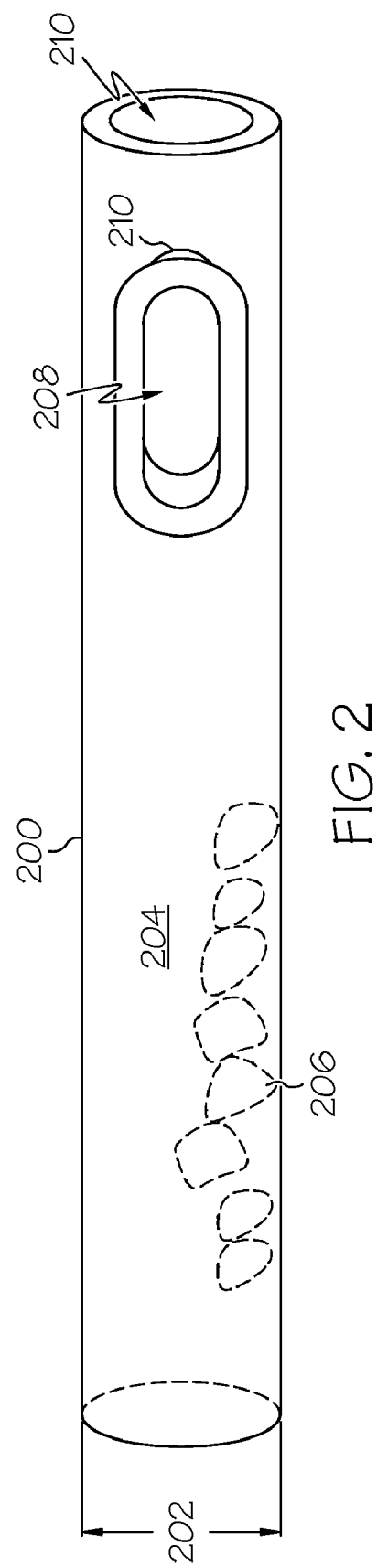
FIG. 2 is a view of the treat container of the exemplary treat dispenser of FIG. 1 with the plush covering removed.

With reference now to the figures and in particular with reference to FIGS. 1-2, there are respectively illustrated an exterior view of an exemplary animal treat dispenser 100 and the treat container of the animal treat dispenser in accordance with one embodiment. As shown, animal treat dispenser 100 has a treat container 200, which in the illustrated embodiment is elongate and generally cylindrical. Although a cylindrical form is shown, treat container 200 may have other shapes (including an irregular shape) in other embodiments.

In a preferred embodiment, treat container 200 is a unitary member formed of a plastic by injection molding. At least one exterior diameter 202 of treat container 200 is preferably sized to permit an animal, such as a dog, that is an intended user of animal treat dispenser 100 to span diameter 202 with its jaws. Treat container 200 is preferably formed of a material having a combination of mechanical properties and wall thickness sufficient to resist deformation and/or resiliently return to its original shape following deformation by an animal's jaws.

Treat container 200, which has at least one interior cavity 204 for containing animal treats 206, has at least one aperture 208 formed therein through which animal treats are dispensed. In this illustrated embodiment, the outlet of aperture 208 is spaced from a main body of treat container 200 by a short channel 210 extending outwardly from the main body of treat container 200. In a preferred embodiment, channel 210 has a maximum interior dimension in a plane parallel to aperture 208 that is smaller than corresponding dimension of interior cavity 204 and a length at least equal to an uncompressed thickness of the plush fabric covering of treat container 200, as discussed further below.

In a preferred embodiment, the effective size of aperture 208 is adjustable by an aperture adjustment mechanism 300 to permit a human to control the rate of dispensing of items, such as treats 206, from interior cavity 204 via aperture 208. One possible embodiment of the aperture adjustment mechanism is described with reference to FIGS. 3A-3B, to which reference is now additionally made.

Figure 3A:
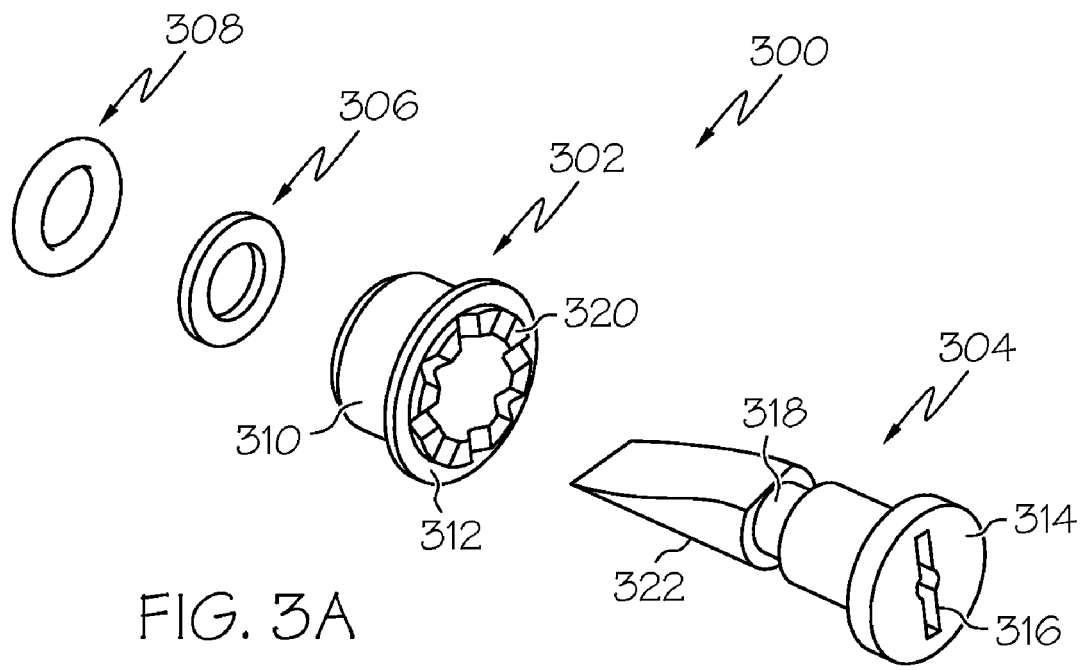
FIG. 3A is an exploded view of an aperture adjustment mechanism in one embodiment.
Figure 3B:
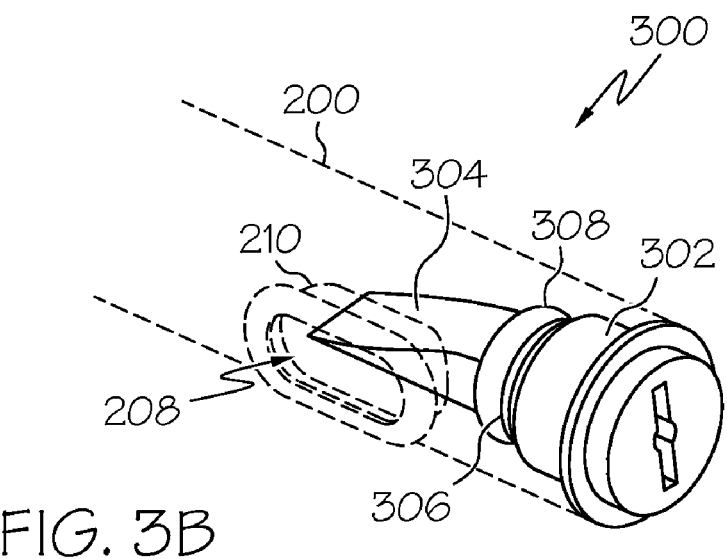
FIG. 3B is an view of the aperture adjustment mechanism of FIG. 3A as assembled with the treat container.

As shown, aperture adjustment mechanism 300 of FIGS. 3A-3B includes a cam 302, spade-shaped plunger 304, and washer 306, which may all be molded, machined or otherwise formed of one or more rigid or semi-rigid plastics, as well as an O-ring 308, which may be rubber. In the illustrated embodiment, treat container 200 has an opening 210, which is proximate to aperture 208 and in a plane generally orthogonal to a plane containing the outlet of aperture 208. Opening 210 is sized to snugly receive and fixedly retain by interference fit (and/or adhesive bond) smaller diameter portion 310 of cam 302. A precise depth to which cam 302 can be inserted into opening 210 of treat container 200 is controlled by collar stop portion 312 of cam 302, which has a larger diameter than that of opening 210. As shown, the outward facing surface of a collar stop portion 312 of cam 302 may have formed therein a series of notches representing rotational positions of plunger 304, which is sized to be rotatably received within the central opening 320 of cam 302.

Once assembled, plunger 304 is retained in the central opening 320 of cam 302 by washer 306 and O-ring 308, which fit snugly about a neck portion 318 of plunger 304. Plunger 304 further includes a collar stop portion 314 having a larger diameter than central opening 320 of cam 302. In one embodiment, collar stop portion 314 has at least one tooth on its inward facing surface configured to cooperate with the notches in collar stop portion 312 of cam 302, thus releasably retaining plunger 304 in a desired rotational position relative to cam 302 and treat container 200. Rotation of cam 302 is facilitated by a tool-receiving slot 316 formed in the outwardly facing surface of collar stop portion 314. Thus, by applying manual force to collar stop portion 314 of plunger 314 either manually or with a simple tool, such as a screw driver or coin, a person can rotate plunger 304 so that aperture 208 is fully open, partially open, or substantially or completely blocked by wedge portion 322 of plunger 304. Plunger 304 is retained in the selected position, for example, by friction and the interlock of the at least one tooth on plunger 304 and notches on cam 302, until subsequently adjusted. Of course in other embodiments, other mechanisms, such as a rotating or sliding plate, can be used to adjust the effective size of aperture 208.

Animal treats 206 can be inserted into interior cavity 204 via aperture 208. Alternatively or additionally, animal treats 206 may be inserted into interior cavity 204 via an additional opening (not shown), which preferably has a removable cap retained in the fill opening, for example, by interference fit (e.g., a plug) or interlocking threads.

As indicated in FIG. 1, treat container 200 is preferably at least partially (and preferably fully) covered with a rugged fabric covering 102 having an appealing appearance. Fabric covering 102 is preferably padded to provide additional cushioning, resilience and tactile appeal. Fabric covering 102 preferably has a hook-and-loop closure, zipper or other closure to provide access to collar stop portion 314 of plunger 304. Fabric covering 102 further has a hole 106 formed therein that tightly fits about channel 210 and exposes aperture 208.

Attached to fabric covering 102 (e.g., by stitching, hook-and-loop closure, snaps and/or zipper(s), etc.) is a plush toy 108, which in the illustrated embodiment has an appearance of a fanciful animal-like creature. Plush toy 108 is preferably stuffed with a resilient non-toxic stuffing to provide tactile attraction and encourage animal play. Animal interaction with plush toy 108 can be further encouraged by enclosing within plush toy 108 a noise-making device, such as a squeaker or battery-powered speaker, that can be activated by the animal interaction. In a preferred embodiment, plush toy 108 surrounds fabric covering 102 and treat container 200, permitting purchase of an animal's jaws on plush toy 108 regardless of the orientation of animal treat dispenser 100. In the illustrated embodiment, plush toy 108 is also disposed such that an animal can bite down on treat container 200 without encompassing plush toy 108 in its jaws.

Figure 4:
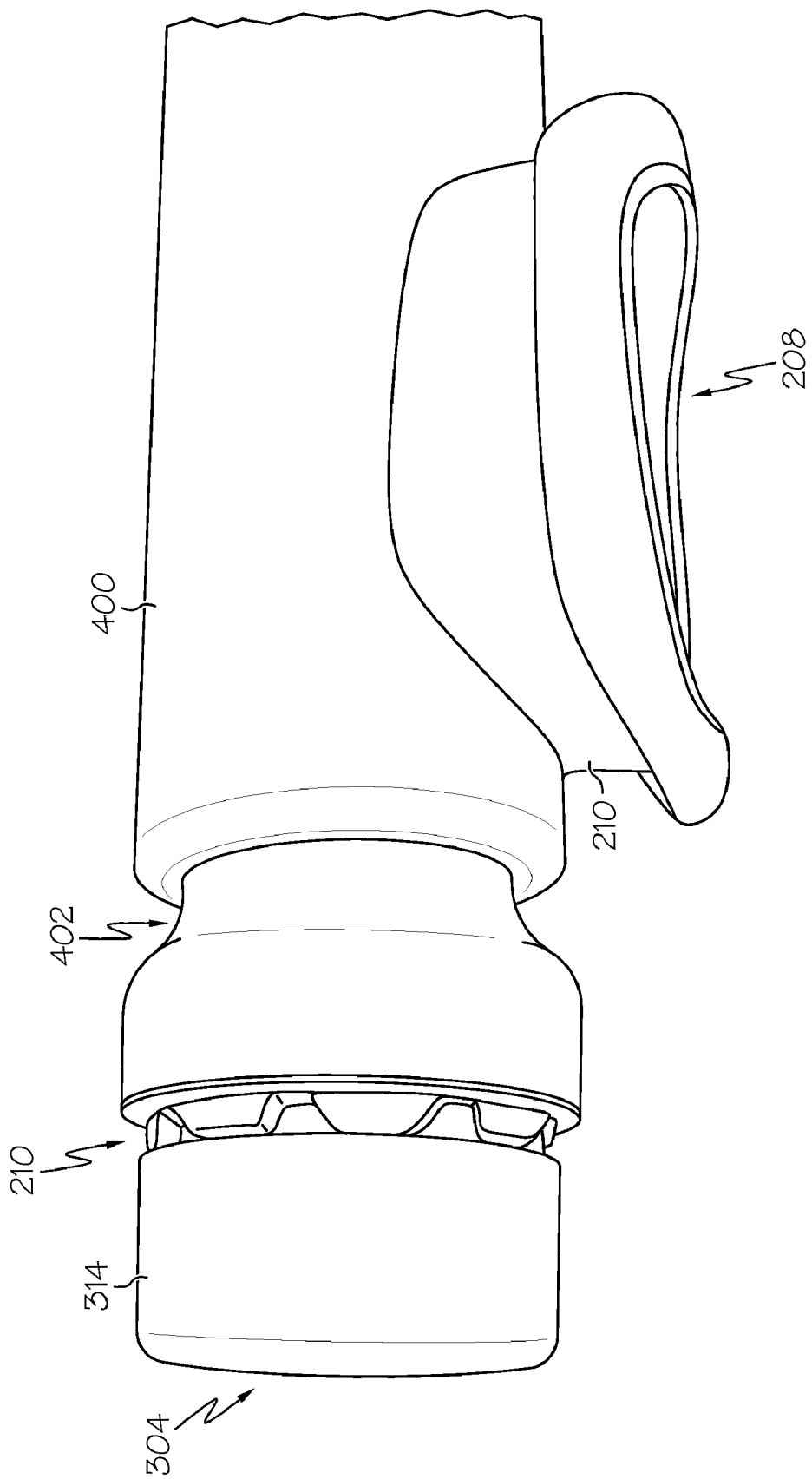
FIG. 4 depicts an alternative embodiment of a treat container assembled with the plunger of FIG. 3A.

With reference now to FIG. 4, there is illustrated an alternative embodiment of a treat container having an aperture adjustment mechanism that is suitable for use in an animal treat dispenser as described above. In the depicted embodiment, treat container 400 is similarly constructed to treat container 200 of FIG. 2 and accordingly has a unitary generally cylindrical body, preferably formed of injection molded plastic. Like treat container 200 of FIG. 2, treat container 400 of FIG. 4 also has an aperture 208 spaced from the main body of treat container 400 by a short channel 210 and an opening 210 through which plunger 304 extends into the interior of treat container 400.

However, with treat container 400 of FIG. 4, the aperture adjustment mechanism can be simplified by the inclusion of a smaller diameter neck portion 402 in the body of treat container 400 that cooperates with neck portion 318 of plunger 304 to rotatably retain plunger 304 in opening 210 without use of a washer 306 or O-ring 308. Consequently, plunger 304 can be assembled with treat container 400 to form an aperture adjustment mechanism by simply applying sufficient manual force to insert plunger 304 into opening 210 of treat container 400 until collar stop portion 314 abuts the open end of treat container 400 and neck portion 318 of plunger 304 aligns with neck portion 402 of treat container 400.

In a typical use scenario of an animal treat dispenser as described herein, a human inserts one or more items to be dispensed, such as treats 206, into interior cavity 204 of animal treat dispenser 100, for example, via aperture 208. Treats 206 can include, for example, one or more of a pet food, kibble, biscuit or other edible substance intended to attract an animal. The human may optionally open fabric covering 102 to adjust the aperture adjustment mechanism 300, for example, by rotating plunger 304 to a desired position. The human then provides animal treat dispenser 100 to an animal, such as a dog, to interact with. As the animal interacts with animal treat dispenser 100, for example, by biting, shaking or otherwise moving animal treat dispenser 100, treats 206 pass from interior cavity 204 through channel 210 and exit aperture 208, permitting the animal to eat the treats and encouraging further interaction. If the human desires to vary the rate of dispensing of the treats 206, the human can, of course, further adjust the aperture adjustment mechanism 300 to achieve the desired dispensing rate for treats 206.

It will be appreciated that, during interaction of the animal with animal treat dispenser 100, plush toy 108 and/or fabric covering 102 will become worn and/or torn over time. In embodiments in which plush toy 108 is attached to fabric covering 102 in a removable and reattachable fashion (e.g., with hook-and-loop closure, zippers and/or snaps), the human can replace plush toy 108 and/or fabric covering 102 as needed or desired, while retaining treat container 200.

As has been described, in at least one embodiment, an animal treat dispenser includes a treat container having an aperture, an aperture adjustment mechanism that is capable of varying an effective size of the aperture to regulate passage of animal treats through the aperture, and a plush toy at least partially covering the treat container.

While the present invention has been particularly shown as described with reference to one or more preferred embodiments, it will be understood by those skilled in the art that various changes in form and detail may be made therein without departing from the spirit and scope of the invention.

What is claimed is:

1. An animal treat dispenser, comprising:
a treat container having an aperture;
a fabric covering of the treat container;
an aperture adjustment mechanism that is capable of varying an effective size of the aperture to regulate passage of animal treats through the aperture; and
a plush toy at least partially covering the treat container, wherein the plush toy is attached to an exterior of the fabric covering.

2. The animal treat dispenser of claim 1, wherein the plush toy has an appearance of a simulated animal.

3. The animal treat dispenser of claim 1, and further comprising animal treats within the treat container.

4. The animal treat dispenser of claim 1, wherein the treat container is formed of injection-molded plastic.

5. The animal treat dispenser of claim 1, and further comprising a noise maker enclosed within the plush toy.

6. The animal treat dispenser of claim 1, wherein the treat container is generally cylindrical.

7. The animal treat dispenser of claim 1, wherein:
the fabric covering has a hole therein; and
the treat container includes a main body and a channel extending outwardly from the main body through the hole in the fabric covering.

8. An animal treat dispenser, comprising:
a treat container having an aperture;
an aperture adjustment mechanism that is capable of varying an effective size of the aperture to regulate passage of animal treats through the aperture, wherein the aperture adjustment mechanism includes a rotatable partial plug; and
a plush toy at least partially covering the treat container.

9. The animal treat dispenser of claim 8, wherein:
the treat container includes an opening adjacent the aperture;
the rotatable partial plug includes:
a cam retained in the opening of the treat container, the cam having an central opening;
a plunger rotatably retained within the central opening of the cam and extending into the treat container to partially block the aperture when placed in at least one rotational position.

10. An animal treat dispenser, comprising:
a unitary plastic treat container having an aperture;
an aperture adjustment mechanism that is capable of varying an effective size of the aperture to regulate passage of animal treats through the aperture;
a fabric covering of the treat container; and
a plush toy attached to an exterior of the fabric covering and at least partially covering the treat container.

11. The animal treat dispenser of claim 10, wherein the plush toy has an appearance of a simulated animal.

12. The animal treat dispenser of claim 10, and further comprising animal treats within the treat container.

13. The animal treat dispenser of claim 10, and further comprising a noise maker enclosed within the plush toy.

14. The animal treat dispenser of claim 10, wherein the treat container is generally cylindrical.

15. The animal treat dispenser of claim 10, wherein:
the fabric covering has a hole therein; and
the treat container includes a main body and a channel extending outwardly from the main body through the hole in the fabric covering.

16. The animal treat dispenser of claim 10, wherein the aperture adjustment mechanism includes a rotatable partial plug.

17. The animal treat dispenser of claim 16, wherein:
the treat container includes an opening adjacent the aperture;
the rotatable partial plug includes:
a cam retained in the opening of the treat container, the cam having an central opening;
a plunger rotatably retained within the central opening of the cam and extending into the treat container to partially block the aperture when placed in at least one rotational position.

\* \* \* \* \*